United States Patent Office 2,721,854
Patented Oct. 25, 1955

2,721,854

POLYVINYL ACETAL MODIFIED SILICONE-ALKYD RESINS

Charles F. Kohl, Midland, Mich., assignor to Dow Corning Corporation, Midland, Mich., a corporation of Michigan No Drawing. Application May 24, 1954,
Serial No. 432,046

8 Claims. (Cl. 260—44)

This invention relates to silicone-alkyd resins modified with polyvinyl acetal resins, to electrical conductors insulated with such resins and to the methods of producing such insulated conductors.

Various lacquers, enamels, resins and other materials have long been employed as electrical insulating materials. Each of the materials heretofore known had characteristics which were desirable, but each one also had undesirable characteristics. For example, organopolysiloxane resins have excellent thermal stability at high temperature, but they do not have sufficient physical strength such as abrasion resistance. Organopolysiloxane resins modified with alkyds give stronger films but wire of small diameter, i. e. number 36 wire or smaller, cannot be satisfactorily coated with such resins. Further, whereas round wire of larger sizes can be coated with such silicone-alkyd resins, rectilinear wire cannot be so coated because although the resin coats the flat surfaces of such wire, it does not coat the edges where the flat surfaces intersect and such a non-continuous coating is of no value as an electrical insulation. Further, in order to obtain a resin-solution having a viscosity such that the wire will pick up sufficient resin solids for a good coating, the resin solids content of the organosiloxane-alkyd resin solution had to be very high and this in turn required a small die clearance which lead in turn to frequent stoppages due to fouling of the wire in the dies caused by minor irregularities in the wire.

On the other hand, the well known organic resins are unsatisfactory because of the limited heat stability of such materials. For example, polyvinyl acetal resins, such as those described in U. S. Patent No. 2,085,995, and phenol-aldehyde modified polyvinyl acetal resins such as those described in U. S. Patent No. 2,307,588, although satisfactory for moderate operating temperatures (i. e. less than 105° C.) are unsatisfactory for high temperatures (i. e. above 105° C.) because of their lack of heat stability.

Mixtures of the heat stable organosiloxane resins and the polyvinyl acetal resins and modifications thereof have also proved inadequate. Such resins are described in some detail in U. S. Patent No. 2,506,320, but they have never become commercially important because these resins are thermoplastic at relatively moderate temperatures and thus they run off the wire and/or they permit the wires to become uncovered and thus short out. Further, such resin mixtures have very poor solvent resistance and are generally inadequate as magnet wire insulation.

The primary object of this invention is to produce a novel composition of matter which exhibits the heat stability of the organopolysiloxane resins and the desirable physical qualities of the polyvinyl acetal resins. Another object is to produce a resin which has good coating qualities for wires of all sizes and shapes. Another object is to produce a conductor insulated with the novel organosilicon compounds of this invention. Another object is to produce a solution of an organopolysiloxane insulating resin having the viscosity and per cent solids content desired for the die coating techniques presently employed in the art.

This invention relates to a composition of matter consisting essentially of (a) 40 to 99 per cent by weight of a silicone-alkyd resin which is the reaction product of (1) 5 to 60 per cent by weight of an organosilicon compound of the formula

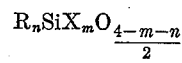

$$R_nSiX_mO_{\frac{4-m-n}{2}}$$

where R is selected from the group consisting of monovalent hydrocarbon radicals and halogenated monovalent hydrocarbon radicals, X is selected from the group consisting of halogen atoms, alkoxy radicals and hydroxy radicals, and $n$ has an average value of from 1 to 2 inclusive, $m$ has an average value of from .05 to 3 inclusive, and the sum, $m+n$, is not greater than 4; (2) 10 to 30 per cent by weight of polyhydroxy alcohol selected from the group consisting of trihydroxy alcohol, tetrahydroxy alcohol and up to 50 per cent by weight based on the total weight of the alcohol of dihydroxy alcohol; (3) 30 to 70 per cent by weight of a compound selected from the group consisting of dicarboxylic acid, dicarboxylic acid anhydrides, and lower alkyl esters of dicarboxylic acids; and (b) 1 to 60 per cent by weight of polyvinyl acetal resin having incorporated therewith a heat-hardenable phenol-aldehyde resin in amount up to 50 per cent by weight based on the total weight of the polyvinyl acetal and phenol-aldehyde resins.

The organosilicon compounds operable in this invention and designated as ingredient (1) of the silicone-alkyd resins of the preceding paragraph, include monomeric silanes, polymeric partial hydrolyzates of silanes, and monomeric and polymeric completely hydrolyzed silanes. The polymeric partial hydrolyzates of silanes are polysiloxanes which contain residual alkoxy groups or halogen atoms attached to silicon atoms. The completely hydrolyzed silanes are either monomeric silanols or hydroxylated polysiloxanes. These hydrolyzates and partial hydrolyzates are prepared by methods well known in the art.

For the purposes of this invention, the R groups on the organosilicon compounds can be any monovalent hydrocarbon radical and/or any halogenated monovalent hydrocarbon radical. The X groups on the organosilicon compounds can be halogen atoms and/or any alkoxy radical and/or hydroxy radical. The organosilicon compound can contain more than one type of R group and more than one type of X group. There are on the average from 1 to 2 R groups per silicon atom and on the average from .05 to 3 X groups per silicon atom, but the sum of the average number of R groups and X groups cannot exceed 4.

Specific examples of organosilicon compounds which are operative in this invention are dimethyldichlorosilane, dibutyldiisopropoxysilane, phenylmethyldiethoxysilane, divinyldibutoxysilane, tolyltriethoxysilane, cyclohexyltrimethoxysilane, phenylmethyldibromosilane, (trifluoromethylphenyl) methyldichlorosilane, chlorophenyltriethoxysilane, bromoxenyltrichlorosilane, stearylmethyldiethoxysilane, allylstearyloxydimethoxysilane, and mixtures thereof and partial and/or complete hydrolyzates of such silanes and/or mixtures of such materials. Also operative are diphenylsilanediol, phenylmethylsilanediol, dimethylsilanediol, chlorophenylmethylsilanediol, octadecylmethylsilanediol, and combinations thereof. It is to be understood that the foregoing list is merely representative of the organosilicon compounds operable in this invention and is not a complete and exclusive listing.

If desired, up to 50 percent by weight of the organosilicon compound, ingredient (1) of the siliconealkyd resin, may be replaced with drying oils and/or drying oil acids. A mixture of 50–100 per cent by weight of the defined organosilicon compound and 0–50 per cent by weight of the drying oil and/or drying oil acid is operable. Examples of drying oil acids which are operable herein include linseed oil acid, sardine oil acid, soya bean oil acid, dehydrated castor oil acid, tung oil acid, oiticica oil acid, perilla oil acid, chia oil acid, hempseed oil acid, poppyseed oil acid, safflower oil acid, sunflowerseed oil acid, and walnut oil acid. The drying oils whose acid derivatives are listed above are illustrative of the drying oils operative herein. It is to be understood that drying oils, drying oil acids and organosilicon compounds can be combined in any manner desired so long as the proportions are within the range set forth above.

The polyhydroxy alcohols, set forth as ingredient (2) of the silicone-alkyd resins, are dihydroxy alcohols, trihydroxy alcohols and tetrahydroxy alcohols. The dihydroxy alcohols cannot be employed alone, but can be employed admixed with trihydroxy and/or tetrahydroxy alcohols, and when so admixed, the dihydroxy alcohol cannot exceed 50 per cent by weight of the total weight of the alcohol mixture. Illustrative of the alcohols which are operable herein are ethylene glycol, neopentyl glycol, glycerine, pentaerythritol, trimethylol ethane, and trimethylol propane.

Ingredient (3) of the silicone-alkyd resins of this invention is dicarboxylic acid and/or dicarboxylic acid anhydrides and/or lower alkyl esters of dicarboxylic acid. Any dicarboxylic acid or mixture of dicarboxylic acids is operative herein. Illustrative of such acids are aliphatic dicarboxylic acids such as malonic acid, adipic acid, sebacic acid, maleic acid, and dimethyl-maleic acid, cycloaliphatic dicarboxylic acids such as cyclohexyldicarboxylic acid and aromatic dicarboxylic acids such as methylene disalicyclic acid, phthalic acid, terephthalic acid, isophthalic acid, naphthalic acid, stilbenedicarboxylic acid, diphenic acid, tolanedicarboxylic acid and dibenzyldicarboxylic acid. Anhydrides of the acids listed in the preceding sentence are illustrative of the anhydrides operative in this invention. Alkyl esters of dicarboxylic acid wherein the alkyl substituent contains less than 9 carbon atoms are also operative in this invention. Illustrative of such alkyl esters are the methyl, ethyl, propyl and amyl esters of the dicarboxylic acids listed above.

The polyvinyl acetal resins are prepared by condensing polyvinyl esters and/or polyvinyl alcohols with aldehydes as detailed in for example, U. S. Patent No. 2,085,995. Illustrative of the aldehydes which may be employed in preparing the polyvinyl acetal resins are formaldehyde, acetaldehyde, propionic aldehyde, butyric aldehyde and benzaldehyde. Similarly, illustrative of the polyvinyl esters are polyvinyl acetate, polyvinyl propionate and polyvinyl butyrate. Perhaps the best known of the polyvinyl acetal resins is polyvinyl formal, available commercially as "Formvar," which may be prepared by condensing a hydrolyzed polyvinyl ester with formaldehyde. The polyvinyl acetal resins may be employed alone or admixed with a minor amount of a phenol-aldehyde resin.

The polyvinyl acetal resin may be modified by incorporating therein any heat-hardenable phenol-aldehyde resin. For the purpose of this invention the aldehyde can be, for example, formaldehyde, acetaldehyde, benzaldehyde, cinnamic aldehyde and propionaldehyde. The preferred phenolic resins are those described in U. S. Patent No. 2,307,588. Illustrative of the phenols which can be used in the phenolic resins are phenol, cresols, xylenols, wood oil phenols, petroalkyl phenols and the like.

The manner of preparation of the silicone-alkyd resins is not critical. The various reactants may be added in any order desired or the alcohol and dicarboxylic acid may first be reacted and the organosilicon compound then added, or any other variation may be employed without departing from the scope of this invention. Similarly, the manner of preparation of the polyvinyl-acetal resins and/or polyvinyl acetal-phenol aldehyde resins is not at all critical and any method may be employed for preparing such resins without departing from the scope of this invention. The silicone-alkyd resins and polyvinyl acetal resins may be admixed by any desired procedure.

The wire or other conductor can be coated with the resin mixtures of this invention by any of the well known methods presently employed for this purpose. The necessary viscosity for successful die coating followed by an oven bake can be obtained with a solids content in the resin solution which is well within the practical limits for the wire coating towers presently in operation.

The resins of this invention can be applied on a commercial basis to fine wires (e. g. smaller than No. 36 wire) as well as to wires having a rectangular or hexagonal or other rectilinear cross section. These resins are remarkably resistant to heat shock. For example, the unmodified silicone-alkyd resins are subject to crazing when the coated wire is elongated by 10 per cent of its original length and wound around a mandrel 10 times the diameter of the wire and heated to 200° C., but the resins of this invention do not craze even when similarly elongated and wound around a mandrel 4 times the diameter of the wire and heated to 200° C. This is of vital importance for coated magnet wire to be used, for example, in motor coils because such wire is normally wound tightly and subject to relatively high temperatures. Further, the resins of this invention form strong films which are substantially unimpaired by up to 30 per cent elongation of the wire on which they are coated.

The following examples are illustrative only and are not to be construed as limiting the invention which is properly delineated in the appended claims. All parts and percentages are based on weight unless otherwise specified.

Example 1

An alkyd resin A was prepared by reacting 17 per cent glycerine (based on the total weight of silicone-alkyd resin subsequently prepared), 8.5 per cent ethylene glycol and 53.5 per cent dimethylterephthalate. The reaction was carried out by heating the mixture at 230° C. in the presence of magnesium acetate as a catalyst, in a nitrogen atmosphere until approximately the theoretical amount of methanol was removed. The resulting polymer was dissolved to 50 per cent solids in cresylic acid and 21 per cent, based on the total silicone-alkyd resin, of a partially hydrolyzed methoxylated phenylmethylsiloxane containing 30 per cent methoxy groups was added. The mixture was heated to 200° C. until the theoretical amount of methanol was removed. The reaction product was then filtered.

The polyvinyl formal resin B employed herein consisted of 33 parts cresol-formaldehyde and 67 parts polyvinyl formal resin dissolved in a mixture of cresylic acid and E. W. naphtha commonly known as "wire enamel naphtha" and having a distillation range of 155° to 290° C., with 75 to 85 per cent distilling off at 200° C. as disclosed in U. S. Patent 2,307,588.

Resin solutions A and B were mixed so that the silicone-alkyd resin solids made up 80 per cent by weight and the polyvinyl formal resin solids 20 per cent by weight of the total resin solids in solution. The concentration of the solution was 33.3 per cent by weight of total resin solids and it had a viscosity of 6,000 cps. at 25° C. Copper wire, size number 18, was passed through the solution and through a vertical oven ten feet in length, at a speed of 22 feet per minute, wherein the temperature was graduated from 80° to 100° C. at the bottom to 510° to 550° C. at the top. The solvent was driven off and the resin coating cured. The dipping-curing cycle was repeated six times and a resin coating 3.2 mils in thickness was built up.

The wire coated as above was subjected to a standard heat shock test as follows: The wire was elongated by 10 per cent of its original length and was wound around mandrels of various sizes. The wire wound mandrels were placed in an oven and heated to 225° C. for 30 minutes. At the end of this time the wire was inspected and no crazing had occurred on wire wound on mandrels 5 times the diameter of the wire or larger. By way of contrast, the unmodified silicone-alkyd resin fails or crazes on a mandrel 15 times the diameter of the wire.

The heat stability of the resinous coatings prepared as described above is approximately the same as the heat stability of the straight silicone-alkyd resins. The coated copper wire was operated successfully at 165° C. average wire temperature without deleterious effect to the insulating coating and hot spots of up to 180° C. did not affect the coatings. By way of contrast, the polyvinyl formal resin coatings cannot be operated above 90° C. average wire temperature and/or 105° C. hot spot temperature. In all other respects, the silicone-alkyd-polyvinyl-formal mixtures of this example proved excellent as a wire enamel, and were eminently suited for use in electric motors and the like.

*Example 2*

A mixture composed of 95 per cent by weight of the silicone modified alkyd resin of Example 1 and 5 per cent by weight of the polyvinyl formal resin of Example 1 based on the total resin solids was prepared by the method of Example 1 and coated on a number 20 wire. The coated wire was subjected to the tests described in Example 1 with equivalent results.

*Example 3*

Employing the method and resins of Example 1, a mixture of 90 per cent by weight of the silicone-alkyd resin and 10 per cent by weight of the polyvinyl formal resin was prepared. This resin was tested and found to be excellent for use as a magnet wire enamel.

*Example 4*

50 per cent by weight of the silicone-alkyd resin of Example 1 was mixed with 50 per cent by weight of a polyvinyl formal resin available commercially as Formvar 15/95E. This formal resin contained no phenol-aldehyde resin. The mixture was dissolved in cresylic acid and E. W. naphtha to 21 per cent resin solids in solution. The solution had a viscosity of 28,000 cps. at 25° C. Wire coated with this resin as described in Example 1 did not heat shock when wrapped around a mandrel of a size equal to the wire diameter and heated to 225° C. for 30 minutes. In all other respects this material was satisfactory as an insulating material suitable for use on magnet wire enamel.

*Example 5*

An alkyd resin was prepared by reacting 124 parts of ethylene glycol, 245.4 parts of glycerine and 776 parts of dimethyl terephthalate in the presence of magnesium acetate catalyst, in a nitrogen atmosphere, at 230° C. until essentially the theoretical amount of methanol was removed. The resulting polymer was diluted with cresylic acid and there was added 1,338 parts of a hydroxylated organosilicon compound consisting of 51 mol per cent phenylmethylsiloxane units, 28 mol per cent methylsiloxane units, 14 mol per cent phenylsiloxane units and 7.5 mol per cent diphenylsiloxane units containing 3 per cent by weight of silicon bonded hydroxyl radicals. The mixture of alkyd and silicone was heated to 200° C. for 2 hours and filtered. The filtrate was blended with 20 per cent by weight of the final resin of the polyvinyl formal resin described in Example 1. The resins were compatible in solution and in the film. The coating properties of this resin were excellent.

*Example 6*

A reaction product was prepared from 19 per cent trimethylol ethane, 9.7 per cent ethylene glycol, 51 per cent dimethyl terephthalate and 20.3 per cent of a methoxyl-ated partial hydrolyzate of diphenyl siloxane containing 20 per cent methoxy groups. The reactants were mixed together with magnesium acetate catalyst and heated to 230° C. until essentially the theoretical amount of methanol had been removed. Cresylic acid was added until a solution of 50 per cent solids was obtained. This was filtered and mixed with the polyvinyl formal resin of Example 1 in the ratio of 80 per cent silicone-alkyd and 20 per cent organic resin based on the total resin solids. The resulting wire enamel was entirely satisfactory as a magnet wire enamel.

That which is claimed is:

1. A composition of matter consisting essentially of (a) 40 to 99 per cent by weight of the reaction product of (1) 5 to 60 per cent by weight of an organosilicon compound of the formula

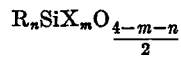

where R is selected from the group consisting of monovalent hydrocarbon radicals and halogenated monovalent hydrocarbon radicals, X is selected from the group consisting of halogen atoms, alkoxy radicals and the hydroxy radical, and $n$ has an average value of from 1 to 2 inclusive, $m$ has an average value of from .05 to 3 inclusive, $m+n$ being not greater than 4; (2) 10 to 30 per cent by weight of polyhydroxy alcohol selected from the group consisting of trihydroxy alcohols, tetrahydroxy alcohols and up to 50 per cent by weight based on the total weight of the alcohol of dihydroxy alcohols; and (3) 30 to 70 per cent by weight of a compound selected from the group consisting of dicarboxylic acids, dicarboxylic acid anhydrides, and lower alkyl esters of dicarboxylic acids; and (b) 1 to 60 per cent by weight of polyvinyl acetal resins having incorporated therewith up to 50 per cent by weight based on the weight of the polyvinyl acetal resin of a heat hardenable phenol-aldehyde resin.

2. As an article of manufacture, an electrical conductor coated with the resins of claim 1.

3. A composition of matter consisting essentially of (a) 40 to 99 per cent by weight of the reaction product of (1) 5 to 60 per cent by weight of a methylphenylsiloxane of the formula $$R_nSiX_mO_{\frac{4-m-n}{2}}$$

wherein at least a portion of the R's stand for methyl radicals and the balance represent phenyl radicals, X is an alkoxy radical, $n$ has an average value of from 1 to 2 inclusive, $m$ has an average value of from .05 to 3 inclusive, $m+n$ being not greater than 4; (2) 10 to 30 per cent by weight of a mixture of 50 to 100 per cent by weight glycerine and 0 to 50 per cent by weight of ethylene glycol; and (3) 30 to 70 per cent by weight of dimethyl terephthalate; and (b) 1 to 60 per cent by weight of a polyvinyl formal resin having incorporated therewith up to 50 per cent by weight based on the weight of the polyvinyl acetal resin of phenol-formaldehyde resin.

4. As an article of manufacture, an electrical conductor coated with the resins of claim 3.

5. A composition of matter consisting essentially of (a) 40 to 99 per cent by weight of the reaction product of (1) 5 to 60 per cent by weight of a methylphenylsiloxane of the formula $$R_nSiX_mO_{\frac{4-m-n}{2}}$$

wherein at least a portion of the R's represent phenyl radicals and the remainder represent methyl radicals and X is a hydroxy radical, $n$ has an average value of from 1 to 2 inclusive, $m$ has an average value of from .05 to 3 inclusive, $m+n$ being not greater than 4; (2) 10 to 30 per cent by weight of a mixture of 50 to 100 per cent by weight glycerine and 0 to 50 per cent by weight of ethylene glycol; and (3) 30 to 70 per cent by weight of dimethyl terephthalate; and (b) 1 to 60 per cent by weight of a polyvinyl formal resin having incorporated therewith up to 50 per cent by weight based on the weight of the polyvinyl acetal resin, of phenol-formaldehyde resin.

6. As an article of manufacture, an electrical conductor coated with the resins of claim 5.

7. A composition of matter consisting essentially of (a) 40 to 99 per cent by weight of the reaction product of (1) 5 to 60 per cent by weight of an organosilicon compound of the formula

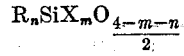

where R represents phenyl radicals, X is an alkoxy radical; $n$ has an average value of from 1 to 2 inclusive, $m$ has an average value of from .05 to 3 inclusive, $m+n$ being not greater than 4; (2) 10 to 30 per cent by weight of a mixture of 50 to 100 per cent by weight glycerine and 0 to 50 per cent by weight of ethylene glycol; and (3) 30 to 70 per cent by weight of dimethyl terephthalate; and (b) 1 to 60 per cent by weight of a polyvinyl formal resin having incorporated therewith up to 50 per cent by weight based on the weight of the polyvinyl acetal resin of phenol-formaldehyde resin.

8. As an article of manufacture, an electrical conductor coated with the resins of claim 7.

References Cited in the file of this patent
UNITED STATES PATENTS

| | | |
|---|---|---|
| 2,587,295 | Doyle et al. | Feb. 26, 1952 |
| 2,687,396 | McLean | Aug. 24, 1954 |